(12) United States Patent
Wolfovich et al.

(10) Patent No.: US 11,118,084 B2
(45) Date of Patent: Sep. 14, 2021

(54) BROMINATED EPOXY POLYMERS AS WOOD COATING FLAME RETARDANT FORMULATIONS

(71) Applicant: BROMINE COMPOUNDS LTD., Beer Sheva (IL)

(72) Inventors: Meyrav Abecassis Wolfovich, Meitar (IL); Smadar Swissa, Meitar (IL); Jakub Lison, Mamaroneck, NY (US); Ella Rapaport, Lachish Darom (IL)

(73) Assignee: BROMINE COMPOUNDS LTD., Beer-Sheva (IL)

( * ) Notice: Subject to any disclaimer, the term of this patent is extended or adjusted under 35 U.S.C. 154(b) by 0 days.

(21) Appl. No.: 16/817,108

(22) Filed: Mar. 12, 2020

(65) Prior Publication Data

US 2020/0239728 A1    Jul. 30, 2020

Related U.S. Application Data

(60) Division of application No. 16/012,251, filed on Jun. 19, 2018, now Pat. No. 10,626,289, which is a (Continued)

(51) Int. Cl.
*C09D 163/00* (2006.01)
*C08K 5/136* (2006.01)
(Continued)

(52) U.S. Cl.
CPC .......... *C09D 163/00* (2013.01); *C08K 3/2279* (2013.01); *C08K 5/136* (2013.01);
(Continued)

(58) Field of Classification Search
CPC .... C09D 163/00; C08K 5/136; C08K 3/2279; C08L 63/00; C08L 33/00; C08L 2201/02; B32B 21/08; C08G 65/2639
See application file for complete search history.

(56) References Cited

U.S. PATENT DOCUMENTS 3,268,619 A * 8/1966 Nametz ................ C08G 59/30
525/482
3,877,974 A 4/1975 Mischutin
(Continued)

FOREIGN PATENT DOCUMENTS

EP 0728798 8/1996
JP 48-32130 4/1973
(Continued)

OTHER PUBLICATIONS

Office Action issued in JP Appln. No. 2016-542436 dated Sep. 4, 2018 (w/ translation).
(Continued)

*Primary Examiner* — Cephia D Toomer
(74) *Attorney, Agent, or Firm* — Nixon & Vanderhye PC

(57) ABSTRACT

The present invention discloses novel flame retardant aqueous formulations comprising micronized particles of brominated epoxy polymers having a predetermined molecular weight, their use as flame retardant coating of wood-based substrates, their preparation and flame-retarded wood-based substrates prepared by using them.

5 Claims, 3 Drawing Sheets

Figure 1:
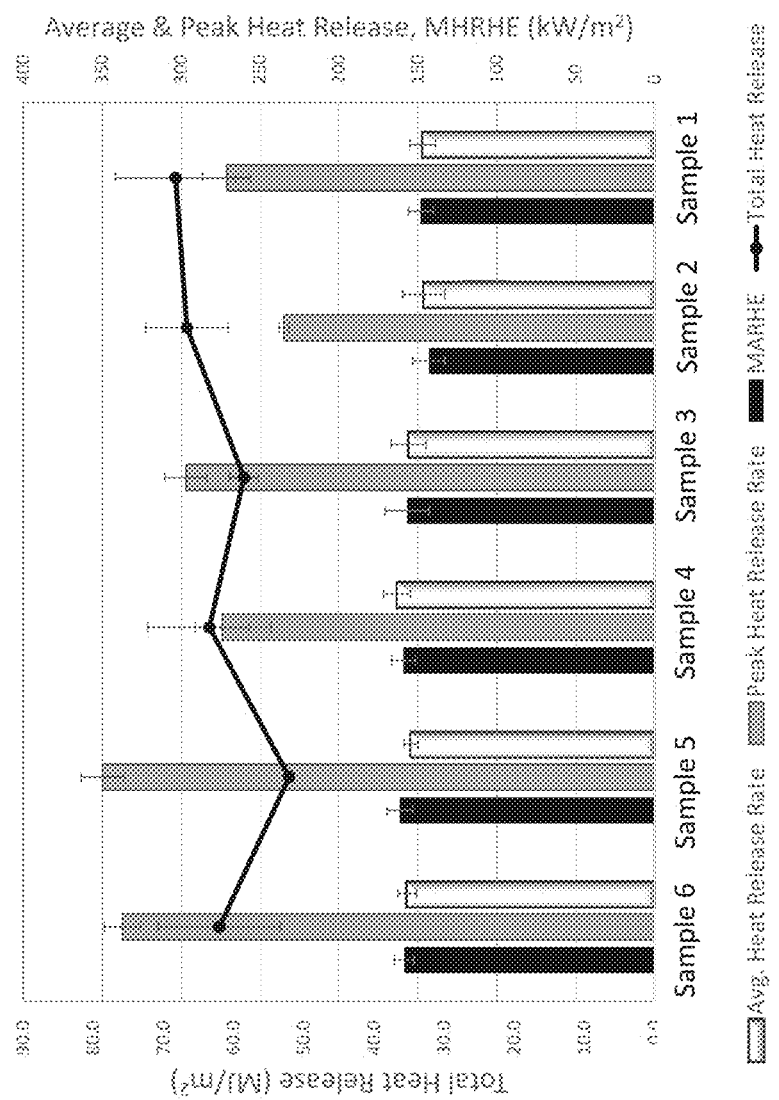

Related U.S. Application Data continuation-in-part of application No. 14/917,694, filed as application No. PCT/IL2014/050807 on Sep. 11, 2014, now Pat. No. 10,533,278.

(60) Provisional application No. 61/876,783, filed on Sep. 12, 2013.

(51) Int. Cl.
| | |
|---|---|
| *C08L 63/00* | (2006.01) |
| *C08L 33/00* | (2006.01) |
| *C08K 3/22* | (2006.01) |
| *B32B 21/08* | (2006.01) |
| *C08G 65/26* | (2006.01) |

(52) U.S. Cl.
CPC ............... *C08L 33/00* (2013.01); *C08L 63/00* (2013.01); *B32B 21/08* (2013.01); *C08G 65/2639* (2013.01); *C08L 2201/02* (2013.01)

(56) References Cited

U.S. PATENT DOCUMENTS

| | | | |
|---|---|---|---|
| 3,955,032 A | | 5/1976 | Mischutin |
| 4,600,606 A | | 7/1986 | Mischutin |
| 4,762,751 A | | 8/1988 | Girgis et al. |
| 4,997,702 A | | 3/1991 | Gazit et al. |
| 5,019,605 A | * | 5/1991 | Jannic ................ C08K 3/22 |
| | | | 523/218 |
| 5,296,306 A | | 9/1994 | Wang et al. |
| 5,866,672 A | | 2/1999 | Ohara |
| 2004/0121114 A1 | | 6/2004 | Pian et al. |
| 2006/0266986 A1 | | 11/2006 | Day et al. |
| 2008/0280036 A1 | | 11/2008 | Mesa |

FOREIGN PATENT DOCUMENTS

| | | |
|---|---|---|
| JP | 11-179725 | 7/1999 |
| WO | 01/07500 | 2/2001 |
| WO | 2004/108826 | 12/2004 |
| WO | 2006/035868 | 4/2006 |
| WO | 2015/036998 | 3/2015 |

OTHER PUBLICATIONS

Office Action issued in U.S. Appl. No. 14/917,694 dated Nov. 16, 2018.
International Search Report issued in PCT/IL2014/050807 dated Mar. 2, 2015, 4 pages.
Written Opinion of the ISA issued in PCT/IL2014/050807 dated Mar. 2, 2015, 10 pages.
A Vento et al., "Antimony and Other Inorganic Compounds," *Kirk-Othmer Encyclopedia of Chemical Technology*,1980, vol. 10, 3rct ed., pp. 355-372, John Wiley & Sons.
Gardner, "Toxicological risks of selected flame-retardant chemicals," 2000, *Environment Studies & Toxicology*, National Research Council, p. 507, < http://www.nap.edu/catalog/9841.html>.
Touv AL, "Flame Retardants, Antimony and Other Inorganic Agents," *Kirk-Othmer Encyclopedia of Chemical Technology*, pp. 1-19, online edition, John Wiley & Sons. date unknown.

* cited by examiner

BROMINATED EPOXY POLYMERS AS WOOD COATING FLAME RETARDANT FORMULATIONS

This application is a Divisional of U.S. application Ser. No. 16/012,251 filed Jun. 19, 2018, (now U.S. Pat. No. 10,626,289), which is a Continuation-in-Part of U.S. application Ser. No. 14/917,694 filed Mar. 9, 2016, (now U.S. Pat. No. 10,533,278), which is the U.S. national phase of International Application No. PCT/IL2014/050807 filed Sep. 11, 2014 which designated the U.S. and claims the benefit of U.S. Provisional Application No. 61/876,783 filed Sep. 12, 2013, the entire contents of each of which are hereby incorporated by reference.

The present invention relates to the field of flame-retardants and, more particularly, to flame retardant coatings, paints, composites and adhesives, their preparation and efficacy (flame retardancy) in the final applications.

Coatings are an essential part of everyday life both in decorative and functional applications. Consequently, coating flammability is a serious industrial concern.

In recent years, polymers have become more attractive and preferred as flame retardant (FR) agents over small molecules, due to their low biological penetration into cells, and thus epoxy polymers can be used.

Epoxy polymers or epoxy resins, also known as polyepoxides are a class of reactive prepolymers and polymers which contain epoxide groups. Epoxy resins may be reacted (cross-linked) either with themselves through catalytic homopolymerization, or with a wide range of co-reactants including polyfunctional amines, acids (and acid anhydrides), phenols, alcohols, and thiols. These co-reactants are often referred to as hardeners or curatives, and the cross-linking reaction is commonly referred to as curing. Reaction of polyepoxides with themselves or with polyfunctional hardeners forms a thermosetting polymer, often with strong mechanical properties as well as high temperature and chemical resistance. Epoxy polymers have a wide range of applications, including metal coatings, use in electronics/electrical components, high tension electrical insulators, fiber-reinforced plastic materials, and structural adhesives.

Brominated epoxy polymers are known as flame retardants in the plastic industry and are prepared by melting during the preparation of the thermoplastic material fiber. Some examples are listed below:

US20060266986 (to Rhodia) discloses flame retardant yarns and textiles and the process of obtaining them from a thermoplastic matrix, whereby at least one flame-retardant agent is deposited in the threads, fibers and/or filaments during the extrusion production. Among the thermoplastic matrixes disclosed therein are, inter alia, brominated epoxy oligomers.

In another example, EP728798 (to Sumitomo Chemical Company) discloses the preparation of flame retardant thermoplastic polyester resin composition. In particular, it discloses the melting together (melt-kneading) of an impact-resistance improver (A) and of a flame-retardant (B), whereas component B may be, among other options, bromine-containing flame retarders such as brominated epoxy oligomer.

In yet another example, WO2001007500 (by the present applicant) discloses a flame retardant compound for use with thermoplastic resins, which is a halogenated epoxy resin, having its epoxy groups blocked at least partially by halogenated bisphenol monoalkyl ether (HBPMAE).

In a further example, WO2004108826 (to DOW) discloses a curable flame retardant epoxy resin composition including (a) at least one flame retardant epoxy resin; (b) at least one amphiphilic block copolymer, and (c) a curing agent wherein the flame retardant epoxy resin can be a brominated epoxy resin.

However, as noted in all of the examples above, brominated epoxy polymers have never been proposed for wood-coating applications, which have different requirements compared to extrusion and plastic applications.

Lately, in WO2015036998 to some of the inventors, brominated epoxy polymers were successfully formulated for textile finishing applications. Among other requirements, in textile coating applications the flame retardant must be dispersible in aqueous media, must provide dispersions that are stable for 6 months or more, must be compatible with waterborne adhesive emulsions such as latex or polyacrylates, must provide flame retardancy at dry add-ons of less than 50% of the substrate self-weight, must yield a flexible, translucent, continuous and non-flaking coating, must provide a coating that is durable to laundry and must be non-leaching from the coating film.

In light of the desirable properties of said textile-suitable flame retardant formulations based on brominated epoxy polymers, it would be of great advantage to harness these transparent, stable, aqueous dispersions, which are compatible with waterborne adhesive emulsions such as latex or polyacrylates for coating of other materials other than fabric, such as wood. Wood surfaces are desirable substrates to be flame retarded, particularly if the flame retarded substrate maintains its original appearance after the coating application on its surface. However, in the case of wood surface coating, distinct requirements which mainly relate to the physical adsorption of the advantageous flame retardant to the coated wood surface need to be met in order to allow a homogeneous and efficient coating. There are known flame retardant coatings suitable for wood surfaces in the field, for example, US20080280036 (to Cal-West Specialty Coatings) discloses a peelable protective coating based on vinyl acetate—ethylene or vinyl—acrylic emulsions with a flame retardant, mostly intumescent. Applications over laminated or painted wood, inter alia, are disclosed. Easy peel-off is not a desired property of a permanent coating. As a further example, U.S. Pat. No. 5,296,306 (to Great Lakes Chemical Corp.) discloses grafting brominated monomers into styrenic and acrylic latexes, and demonstrates good adhesion, inter alia, to wood. The process is more cumbersome and rigid than blending a flame retardant with a suitable latex. Additionally. U.S. Pat. No. 3,877,974 (to White Chemical Corp) discloses coating flammable materials, mainly textile but also plywood, with a flame retardant coating comprising a brominated compound, metal oxide and a high molecular weight binder. Plywood coated with tetrabromophthalic anhydride and arsenic trioxide 1-2 μm particles, in 10:1 parts of vinyl acetate—ethyl acrylate binder with ca 5:1 parts of titanium dioxide pigment demonstrated self-extinguishing properties. It should be noted, however, that the disclosed wood coating formulation contains tetrabromophthalic anhydride, a low-molecular-weight compound, which as explained above is less favorable in terms of penetration into cells, arsenic trioxide which is highly toxic, and because of the high load of titanium dioxide, the coating is assumed to be non-transparent due to the amount of pigment in said formulation.

Thus, there remains a need to find aqueous dispersions, which yield transparent coating and are suitable as flame retardants for wood. The present invention discloses the successful preparation of stable and efficient brominated epoxy polymer-based aqueous dispersions, which can be easily applied to wood surfaces, giving rise to homogeneous transparent flame retardant coatings.

The present invention illustrates the successful preparation of brominated flame retardant formulations which are suitable and advantageous for wood coating applications, giving rise to a transparent, homogeneous and easy to apply flame retardant coating.

Therefore, according to one aspect of the invention, there is now provided a flame retardant formulation, comprising at least one brominated flame retardant and at least one binding agent which are suitable for wood coating, in the form of an aqueous dispersion, comprising micronized particles of at least one brominated epoxy polymer and an aqueous carrier.

As can be seen from Examples 1-6 herein below, aqueous dispersions comprising micronized particles of at least one brominated epoxy polymer demonstrated effective flame retardant properties while exhibiting homogeneity and transparency when applied to wood. The wood-based substrate sought to be coated with said aqueous dispersions requires a higher binder content than the amount which is needed, for example, for textile applications. This requirement stems from the fact that in many cases of wood-based materials, the main use is as a surface coating which demands higher amount of binder in order to form a uniform coating, in contrast, for example, to some textile applications wherein the flame retardant material can sometimes be directly incorporated into the textile fibers. As used herein, the term "binding agent" refers to a polymeric component of a formulation used to form a coating on the desired surface, e.g. wood surface. Unless the context clearly dictates otherwise, the term may be interchangeably used with "latex", "paint latex", "resin", "polymer resin" and the like.

Therefore, in one aspect, the present invention provides a flame retardant formulation suitable for a wood-based substrate, in the form of an aqueous dispersion, comprising micronized particles of at least one brominated epoxy polymer having a molecular weight ranging from 1,000 to 5,000 grams/mol, water, and at least one binding agent, and further comprising at least one additive selected from the group consisting of a dispersing agent, a flame retardant synergist, a smoldering suppressant agent, a surface active agent, an antifoaming agent, a preservative, a stabilizing agent, a thickening agent, a wetting agent, a suspending agent, a pH buffer, a hardener, a curing agent, a sequestering agent, a detergent, a dye, a pigment, and any mixture thereof. In some embodiments, the formulation as described above comprises a single binding agent. In some embodiments, the binding agent is selected from the group consisting of acrylate-based agents, urethane-based agents, alkyd-based agent resin, saturated polyester based agent resin, epoxy-based resin, and on the like. In some related embodiments, said binding agent is an acrylate-based agent which is self-crosslinking agent.

According to some embodiments, the formulation as described above comprises said at least one brominated epoxy polymer in an amount ranging from 7% to 30% by weight. In some other embodiments, the total amount of solids within the formulation is ranging from 25-60% by weight.

According to the principles of the present invention, end-capped brominated epoxy of the form 2,4,6-tribromophenyl end-capped tetrabromobisphenol, also known by the name bis(2,4,6-tribromophenyl ether)-terminated tetrabromobisphenol A- epichlorohydrin resin, as shown by Formula (I) below:

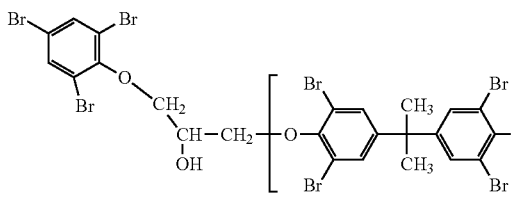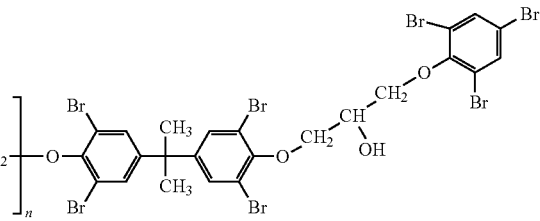

wherein n indicates the degree of polymerization (for example, with weight average molecular weight from 700 to 20,000, e.g., 700-3000), can effectively reduce the flammability of coated wood-based substrate. In some embodiments, the brominated epoxy polymer micronized particles have a size distribution of a $d_{50}<5$ micron, a $d_{90}<10$ micron and a $d_{90}<30$ micron. The compounds of the Formula I may be obtained commercially, or prepared as known in the art.

In some embodiments, the brominated epoxy polymer is characterized by having Tg lower than 160° C., preferably lower than 140° C. and even lower than 130° C.

The term "micronized particles" refers to particles having an average particle size of about 10 microns or less in size. A range from about 1 to 10 microns is contemplated with a range of about 1 to 5 microns preferred with a range of about 1 to 3 microns especially preferred. The micronized particles may be prepared from particles greater than 10 microns in size by using milling techniques known in the art such as wet milling or dry milling. Thus, as used herein, the term "micronized particles" may be interchangeably used with the term "milled particles" or "milled brominated epoxy polymers".

The term "epoxy polymers" may be interchangeably used with the term "epoxy resins" or "polyepoxides" or epoxy prepolymers" or the like, as is known to a person skilled in the art, and generally refer to reactive prepolymers and polymers which contain epoxide groups.

The term "brominated epoxy polymers" refers to epoxy polymers containing within the repeating unit at least one bromine group. The polymers may or may not also be end-capped with bromine-containing groups.

As used herein and in the claims, the term "aqueous dispersion" is interchangeable with the term "latex" and is understood to mean, for the purposes of the present invention, the dispersion of polymer in an aqueous carrier, such as water. The aqueous dispersion is usually characterized by a concentration of solids ranging from 25-60%. The solid content includes all the components of the formulations that are not the aqueous carrier, such as the flame-retardant (FR), binder, dispersing agent, flame retardant synergist, smoldering suppression agent, wetting agent, thickener etc.

As the formulations as described herein may be useful as transparent paints over wood surfaces of an object, the term "substrate" and the term "wood substrate" are used interchangeably herein, unless the context clearly dictates otherwise should be construed either as a wooden surface of an article, or an article having a surface made of wood.

As explained hereinabove, in order to obtain the formulations described herein, it has been found that the brominated epoxy polymer should preferably be ground to a pre-determined size to provide particles having a size which is suitable to enable an effective flame retardation of wood.

Thus, the coarse brominated epoxy polymer particles need to first be micronized before they can be used in the formation of the aqueous dispersions of the present invention. The particles may be micronized by a variety of milling techniques as known in the art, and include both dry milling and wet milling, as detailed further below, of the coarse brominated epoxy polymers particles.

The coarse brominated epoxy polymers particles are typically characterized by an upper "cut-off" of the particle size (largest particle size) which is about 300 microns, preferably a cut-off ranging from about 300 microns to about 270 microns and/or by a $d_{99}$ ranging from about 275 microns to about 100 microns and/or by a $d_{90}$ ranging from about 160 microns to about 60 microns and/or by a $d_{50}$ ranging from about 44 microns to about 22 microns.

The micronized particles of the present invention, obtainable by dry milling or wet milling of the brominated epoxy polymer coarse particles described above, are characterized by a "cut-off" of the particle size which is lower than 35 microns and by a $d_{99}$ which is lower than 30 microns, preferably lower than 25 microns and even lower than 20 microns. Yet preferably, the $d_{99}$ ranges from about 20 microns to about 15 microns, more preferably the $d_{99}$ ranges from about 15 microns to about 7 microns.

Furthermore, the micronized particles of the present invention are characterized by a $d_{90}$ which is lower than 10 microns. Preferably, the $d_{90}$ ranges from about 10 microns to about 7.5 microns, more preferably the $d_{90}$ is lower than 7.5 microns, and ranges from about 7.5 microns to about 5 microns.

Yet further, the micronized particles of the present invention are characterized by a $d_{50}$ which is lower than 5 microns. Preferably, the $d_{50}$ ranges from about 5 microns to about 3 microns, more preferably the $d_{50}$ is lower than 3.5 microns and ranges from about 3.5 microns to about 3 microns.

Thus, according to preferred embodiments of the invention, the particle size of at least 99% of the milled brominated epoxy polymer particles ($d_{99}$) is smaller than about 30 microns, more preferably smaller than 20 microns. According to additional preferred embodiments of the invention, the particle size of at least 90% of the milled brominated epoxy polymer particles ($d_{90}$) is smaller than about 10 microns, more preferably smaller than 7.5 microns. According to yet additional preferred embodiments of the invention, the particle size of at least 50% of the milled brominated epoxy polymer particles ($d_{50}$) is smaller than about 5 microns, more preferably smaller than 3.5 microns. According to another preferred embodiment of the invention, the milled brominated epoxy polymers need to be milled to have a size distribution of $d_{50}$<5 micron and a $d_{90}$<10 micron and a $d_{99}$<30 micron, more preferably of $d_{50}$<3.5 micron, a $d_{90}$<7.5 micron and a $d_{99}$<15 micron.

According to the principles of the present invention, the formulation must comprise at least one binder in order to form a homogenous film having efficient adhesion of the milled brominated epoxy-based flame retardant to the wood-based substrate. Thus, in some embodiments, the at least one binding agent utilized in the formulation as described above is in an amount ranging from 35% to 85% by weight. In some embodiments, the binder is a self-crosslinking polymer, e.g. self-crosslinking acrylic polymer. In some exemplary embodiments, the self-crosslinking acrylic polymers comprise Alberdingk AC 2523. Alberdingk AC 2019, DOW PRIMAL IW 3311, DOW PRIMAL AC-261 and the like. In some other embodiments, the binder is a polyurethane polymer. In some further exemplary embodiments, the polyurethane polymers comprise Alberdingk U 180 VP, Alberdingk® U 9600 VP. Alberdingk® PUR-MATT 340 VP and the like. In further related embodiments, antimony oxide flame retardant synergist is optionally present in the formulation. In a closely related embodiment, the molar ratio between antimony and bromine (Sb:Br) ranges from 1:3 to 1:18. In yet some other embodiments, a dispersing agent in an amount of up to 5% wt is present in the formulation as described above.

In some other embodiments, the formulation as described above comprises a wetting agent and/or a thickening agent in an amount of up to 5% by weight each.

In another aspect, the present invention further provides a process for the preparation of the flame retardant formulation for wood substrate of the invention comprising: a) Obtaining coarse particles of at least one brominated epoxy polymer having a molecular weight ranging from 1,000 to 5,000 grams/mol; b) milling said coarse particles to obtain micronized particles having a size distribution of $d_{50}$<5 micron and a $d_{90}$<10 micron and a $d_{99}$<30 micron; c) preparing an aqueous solution comprising an aqueous carrier, coalescing agent and a dispersing agent; d) adding said micronized particles to said aqueous solution, and mixing said solution to obtain a mixed aqueous dispersion and optionally adding a thickening agent; and e) adding to said mixed aqueous dispersion a binder and optionally adding a smoldering suppression agent and/or a wetting agent and/or a synergist, and mixing said dispersion.

In some embodiments, the preparation process as described above may comprise an additional step, in which at least one additive selected from the group consisting of a surface active agent, an antifoaming agent, a preservative, a stabilizing agent, a suspending agent, a pH buffer, a hardener, a curing agent, a sequestering agent, a detergent, a dye, a pigment and any mixture thereof is added.

In a further aspect, the present invention provides a process for obtaining a flame retarded wood-based substrate, said process comprising applying the flame retardant formulation as described above to a flammable wooden surface. In some embodiments, applying the flame retardant formulation onto the wood-based substrate is affected by means of brushing, spreading, coating, dipping, printing, or spraying. In some embodiments, the application of the flame retardant formulation onto the wood-based substrate takes place at room temperature. Without being bound by theory or mechanism of action, it was demonstrated that the formation of a flame retardant film—which constitutes the flame retardant coating on top of the wooden surface, may occur at both elevated and reduced temperatures, i.e. above freezing temperature, and that the film formation is not limited to room temperature. However, for the purposes of easy application of said formulation, it would be most convenient to apply the formulation at room temperature and avoid the need to, e.g. warm up the surface in order to induce the flame retardant coating formation. The formulation may be characterized by a particular rheological behavior. For the ease of application, the formulation may have a dynamic viscosity of between 3000 and 100 cp, at speed of between 0.3 and 100 rpm, measured at 25° C.

In yet another aspect, the present invention provides a flame retarded wood-based substrate having a homogeneous flame retardant film thereon, said film comprising micronized particles of the at least one brominated epoxy polymer as described above, crosslinked on said wood-based substrate, wherein: a) said brominated epoxy polymer has a molecular weight ranging from 1,000 to 5,000 grams/mol; b) said micronized particles have a size distribution of $d_{50}<5$ micron, $d_{90}<10$ micron and $d_{90}<30$ micron; c) said wood-based substrate comprises a binding agent in an amount of at least 35% by weight; and e) said wood-based substrate optionally further comprises at least one additive selected from the group consisting of a flame retardant synergist, a smoldering suppressant agent, a surface active agent, an antifoaming agent, a preservative, a stabilizing agent, a thickening agent, a dispersing agent, a wetting agent, a suspending agent, a pH buffer, a hardener, a curing agent, a sequestering agent, a detergent, a dye, a pigment and any mixture thereof. In some currently preferred embodiments, said film is transparent.

As appear herein and in the claims, the term "transparent" refers to a property of the film coating the wooden substrate. The meaning of transparent coating as it appears in this application refers to the fact that the texture and/or the wooden color can still be easily observed in the final coated wooden substrate. The term "translucent" as used herein and in the claims refers to a film which is transparent—meaning the wooden color can be seen through the coating of the invention to some extent, while giving rise to a coated substrate having a mat finishing. The transparency of the film of the invention can be measured using DATACOLOR 650, as described in Example 7. The transparent film of the invention is characterized by having transparency values of between about 30% to about 90% as measured by DATACOLOR 650. In some embodiment the transparency values are between 40%-80% as measured by DATACOLOR 650. In some other embodiments, the transparency values are between 45%-75% as measured by DATACOLOR 650.

In a closely related embodiment, the flame retarded wood-based substrate having the flame retardant film thereon displays its original wooden color. In some embodiments, the original wooden color presents in a mat finishing due to the translucent flame retardant coating of the invention. In another embodiment, the flammable wood-based substrate on which the flame retardant coating of the invention is applied to, can be a natural wood substrate, engineered wood and any combination thereof. For example, the wooden substrate may be, but is not limited to, oak, pine, plywood, beech, cherry, and the like.

FIGURES

The following figures depict the results of flammability tests carried out in a cone calorimeter as described in Example 4.

FIG. 1: depicts the heat emission of samples 1 to 6.

Figure 2:
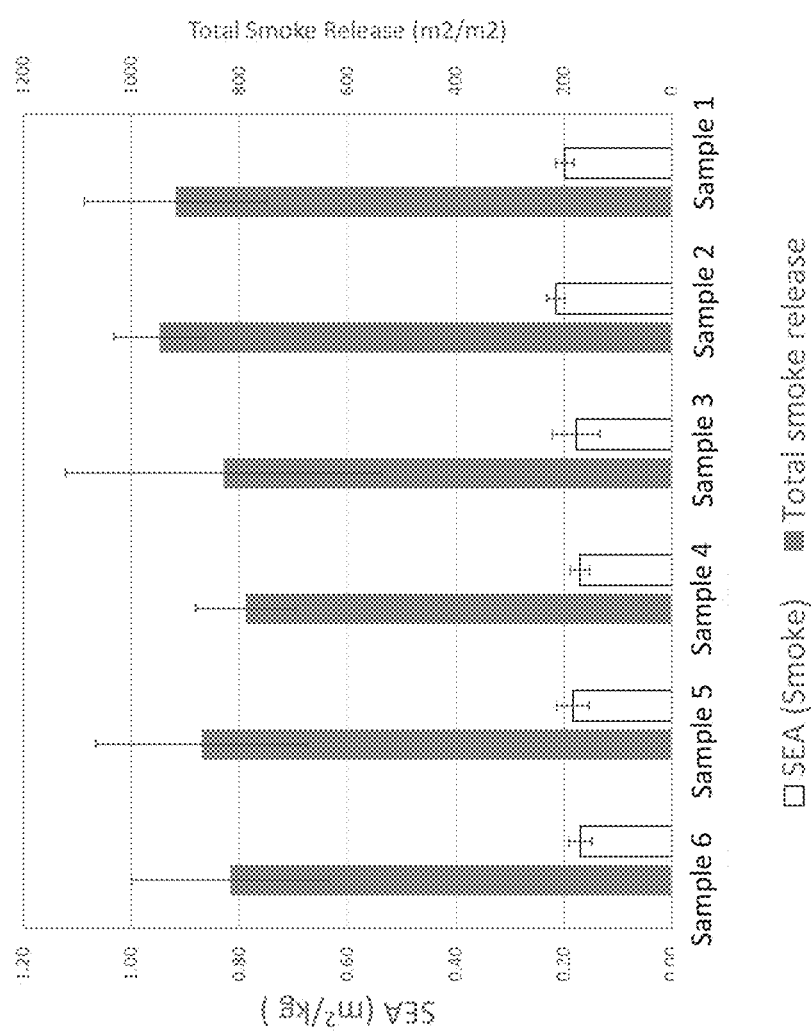

FIG. 2: depicts the smoke emission of samples 1 to 6.

Figure 3:
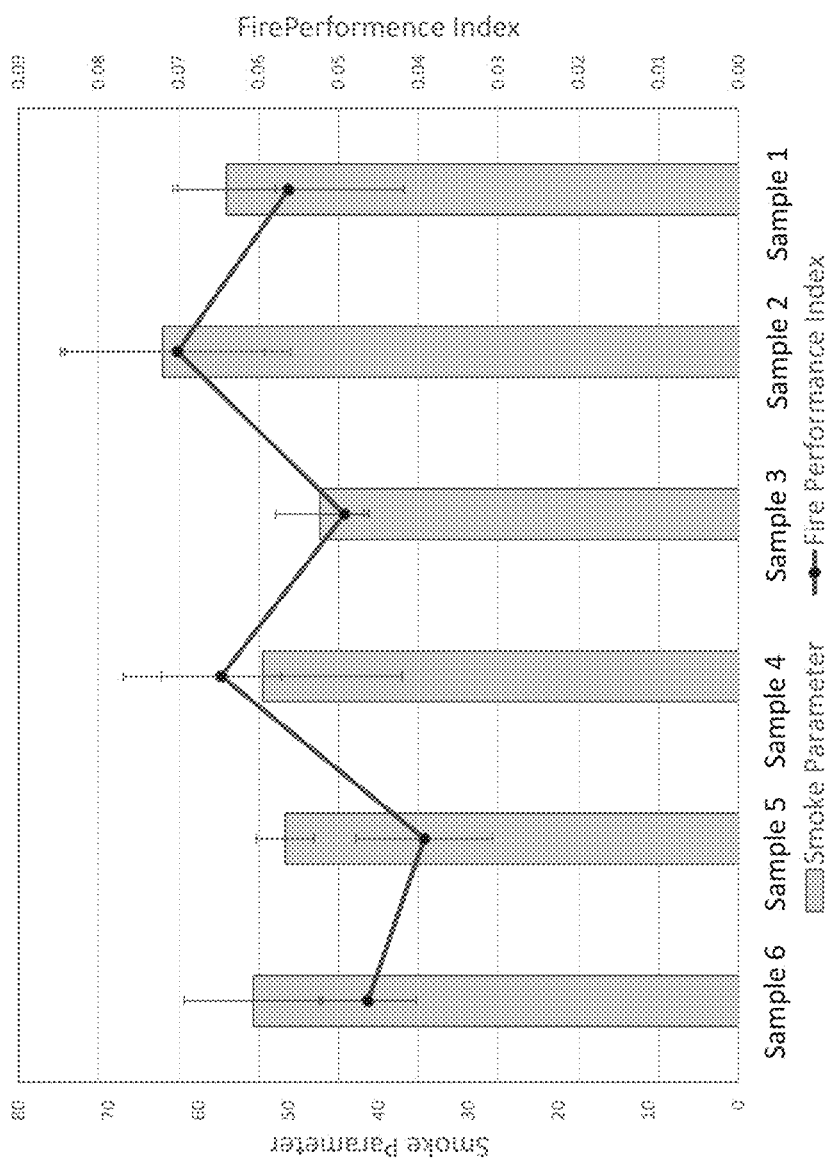

FIG. 3: presents calculated calorimetric parameters of samples 1 to 6.

EXAMPLES

Materials and Methods
Brominated Flame Retardant Polymer
TexFRon®4002 (2,2'-[(1-Methylethylidene)bis[(2,6-dibromo-4, 1-phenylene)-oxymethylene]]-bisoxirane polymer with 2,2',6,6'-tetrabromo-4,4'-isopropylidenediphenol and 2,4,6-tribromophenol. CAS #135229-48-0).

FR1410 used for comparative Example 6 Decabromodiphenyl ethane, CAS 84852-53-9.
Resins
Acrylic based resins: Alberdingk® AC 2523 (47-49% solids, Minimum Film Formation Temperature (MFFT) 0° C.), Alberdingk® AC 2019 (45-47% solids, MFFT 17° C.), Primal™ IW-3311 (41% solids. MFFT 42° C.), polyurethane based resin: Alberdingk® U9600 VP (34-36% solids, MFFT 0° C.);
Auxiliary Additives
BYK-093: defoamer reagent, contains a mixture of foam-destroying polysiloxanes and hydrophobic solids in polyglycol, was obtained from BYK-Chemie GmbH.

BYK-346: wetting agent, a solution of a polyether-modified polysiloxane was obtained from BYK-Chemie GmbH.

BYK-420: thickening agent and anti-settling agent, a solution of a modified urea obtained from BYK-Chemie GmbH.

BYK-2010: wetting and dispersing agent, structured acrylate copolymer with pigment affinic groups obtained from BYK-Chemie GmbH.

Tafigel® PUR 45: thickening agent, non-ionic polyurethane in butyl triglycol/water was obtained from Munzing Chemie GmbH.

PG—propylene glycol coalescing agent obtained from Gadot Chemicals.

Rheolate® 212: thickening agent promoting improved flow of water-based systems, polyether polyurethane based resin in water was obtained from Elementis specialties.

Antimony pentoxide (APO)—flame retardant synergist was obtained from Nyacol Nano Technologies, Inc.
Flammability Tests:
The cone calorimeter and the NFPA 701 vertical burn tests were used for quantitative flammability analysis of the formulations set forth above. Cone calorimeter analysis was conducted in order to evaluate the flammability of the compositions prepared. Data was collected by the cone calorimeter under a heat flux of 50 kW/m$^2$, and specimen separation of 25 mm. The parameters which were investigated were the ignition time, heat release rate (HRR), total heat release (THR) and the HRR peak.

NFPA 701: a method for assessing the propagation of flame in various textiles and films under specified fire test conditions. In this test, a hanging substrate under testing, (plywood was used) was exposed to a 10 cm flame for 45 seconds. After said 45 seconds, the flame was automatically put out, while the flame which was caught by the tested substrate was monitored until it was auto-extinguished, and the duration of said auto-extinguishing was reported in seconds. In the measurements carried out for the present invention, a sample that did not demonstrate auto-extinguishing properties (burned completely) under the test conditions as described above, was reported as "fail".

Cone calorimetry: a fire testing tool based on the principle that the amount of heat released from a burning sample is directly related to the amount of oxygen consumed during the combustion. Briefly, in the cone calorimeter, a radiant heat is projected onto a sample before ignition and during burning of the sample, and several parameters, such as time to ignition and the heat release profile of the tested sample are measured. The amount of heat a material generates is directly correlated with the severity of a fire, such as fire growth rate. The cone gathers data regarding the ignition time, mass loss, combustion products, heat release rate and other parameters associated with its burning properties.

Example 1—Preparation of Micronized Particles

Preparation of micronized end-capped brominated epoxy TexFRon® 4002 (2,2'-[(1-Methylethylidene)bis[(2,6-dibromo-4,1-phenylene)oxymethylene]]bisoxirane polymer with 2,2',6,6'-tetrabromo-4,4'-isopropylidenediphenol and 2,4,6-tribromophenol, CAS #135229-48-0). TexFRon® 4002 was micronized by a Micronizer Jet Mill (dry milling). The particle size distribution before and after the milling was measured using Malvern Mastersizer 2000 in water (3 minutes ultrasonic treatment, 500 psi, 1250 rpm).

Example 2—Preparation of TexFRon® 4002 Aqueous Dispersions—Premix 4002

TexFRon 4002 (66 grams) having a size distribution of $d_{50}$<5 microns, $d_{90}$<10 microns, $d_{99}$<30 microns, was added to a mixed solution containing deionized water (84.8 grams), Disperbyk-2010 (5 grams), BYK-093 (1 g) and propylene glycol (42 g) using a dissolver stirrer (R 1303 Dissolver stirrer IKA with EUROSTAR power control-visc motor, IKA) at a rate of 600 RPM. The dispersion was allowed to mix for 10 minutes. Following said mixing, BYK 420 (1.2 g) was added slowly to the mixture and was left to stir for another 30 minutes, producing 200 gr TexFRon 4002 remix. Table 1 describes the premix composition in terms of percent by weight:

TABLE 1

| Ingredient | wt % |
| --- | --- |
| Water | 42.4 |
| PG | 21 |
| BYK-2010 | 2.5 |
| BYK-093 | 0.5 |
| Flame retardant (TexFRon 4002) | 33 |
| BYK-420 | 0.6 |

The viscosity of TexFRon 4002 premix was measured in Brookfield DVII viscometer, equipped with spindle S63, and gave rise to the following values: 2499 cp at 0.3 rpm, 177 cp at 60 rpm, and 158 cp at 100 rpm; this pseudoplastic behavior is highly desirable for paint applications.

Example 3

A. The preparation of different wood coating formulations comprising TexFRon® 4002 was carried out in two consecutive steps, including the preparation of the water dispersion TexFRon 4002 premix following the procedure described above in Example 2, and mixing said premix with the following ingredients as follows:

For the preparation of formulation comprising 15 wt % TexFRon 4002, Alberdingk 2523 AC (102.4 g), BYK 093 (1.6 g), BYK 346 (0.6 g) and DisperBYK-2010 (2 g) were added during stirring in a dissolver stirrer (R 1303 Dissolver stirrer IKA with EUROSTAR power control-vise motor, IKA) at a rate of 400 RPM. After 10 minutes of mixing, TexFRon 4002 premix (92.4 g) was added during stirring with increased stirring rate of 600 rpm, followed by the addition of Rheolate-212 to form 200 gr of stable acrylic fire retardant coating.

For formulations comprising Antimony Pentoxide dispersion, the latter was slowly added after Rheolate-212 in the last stage followed by additional 10 minutes stirring.

Several coating formulations were prepared as detailed in Table 2, utilizing the preparation procedure as described above, and varying in TexFRon 4002 premix and resin (Alberdingk AC-2523) content as described in Table 2 herein below in terms of percent by weight.

B. Sample preparation: the formulations obtained as described in step A were applied onto plywood boards (30*15*0.3 cm) and pine wood samples (10*10*1 cm) utilizing paint brush (3 layers, with intervals of at least 4 hours to allow drying) on both sides of the board at room temperature. The resultant coatings appeared to have a mat finishing and the original color of the wood samples was observed. The plywood samples were used for the NFPA testing and the pine samples were used for the cone calorimeter testing.

The solids fraction (% solids) in the formulations which appeared in Table 2 was measured by Loss On Drying (LOD) HR-Halogen (Mettler Toledo). The sample was applied on aluminum plate and was heated to 120'C. The weight loss was measured after getting stable weight, the solid fraction was calculated according to the following: 100%−LOD=% solids in formulation The coated plywood substrates were examined under NFPA 701 testing conditions as described above and the auto-extinguishing time was recorded per each coating formulation as summarized in Table 2:

TABLE 2

| | Sample number | | | | | |
| --- | --- | --- | --- | --- | --- | --- |
| | 1 | 2 | 3 | 4 | 5 | 6 |
| Sample name | 15 wt % TexFRon 4200 | 15 wt % TexFRon 4200 + APO | 10 wt % TexFRon 4200 | 10 wt % TexFRon 4200 + APO | 5 wt % TexFRon 4200 + APO | 2.5 wt % TexFRon 4200 + APO |
| Alberdingk AC 2523 (wt %) | 51.2 | 39.59 | 67.4 | 59.86 | 78.63 | 88.02 |
| APO (wt %) | — | 11.61 | — | 7.54 | 3.77 | 1.88 |
| BYK-093 (wt %) | 0.8 | 0.8 | 0.8 | 0.8 | 0.8 | 0.8 |
| BYK-346 (wt %) | 0.3 | 0.3 | 0.3 | 0.3 | 0.3 | 0.3 |
| BYK-2010 (wt %) | 1 | 1 | 1 | 1 | 1 | 1 |
| Premix-4002 (wt %) | 46.2 | 46.2 | 30 | 30 | 15 | 7.5 |
| Rheolate-212 (wt %) | 0.5 | 0.5 | 0.5 | 0.5 | 0.5 | 0.5 |

TABLE 2-continued

|  | Sample number | | | | | |
|---|---|---|---|---|---|---|
|  | 1 | 2 | 3 | 4 | 5 | 6 |
| NFPA 701 (sec) | 9.03 | 3.23 | 55.4 | 2.27 | fail | fail |
| % solids (measured) | 40.8 | 40.7 | 46.5 | 43.5 | 44.4 | 47.1 |

According to Table 2, it can be seen that samples comprising less than 10 wt % TexFRon 4002 in their coating formulation failed in the burning test—and were totally burned. Additionally, sample number 3, having 10 wt % TexFRon 4002 which was APO-free, took a long time to auto-extinguish (55.4 seconds) while a similar sample having 10 wt % TexFRon 4002 and containing APO demonstrated a much shorter auto-extinguishing time (2.27 seconds). This later effect of APO presence was consistent also in the samples comprising 15 wt % TexFRon 4002 (samples 1 and 2), where APO appeared to shorten the time needed in order to achieve an auto-extinguished sample.

Example 4

Flammability measurements according to ASTM E1354 standard were carried out utilizing cone calorimeter Stanton Redcroft. The heat release of coated 100 mm×100 mm×10 mm plywood samples were measured, using heat flux of 50 kW/m² and Specimen Separation of 25 mm.

Calculated values: 1) Smoke parameter: Peak heat release*SEA*$10^{-3}$ (SEA is specific extinction area m² kg$^{-1}$). 2) Fire performance index: Time of ignition/peak heat release rate Heat emission measurement of the samples prepared according to Table 2 are depicted in FIG. 1. According to FIG. 1, APO containing samples 2 and 4 having 15 and 10 wt % TexFRon 4002, respectively, demonstrated a lower peak heat release rate than corresponding samples 3 and 5, which were APO-free. According to FIG. 2, similar samples in terms of brominated epoxy flame retardant content demonstrated similar smoke release values with and without APO. According to FIG. 3, the overall fire performance index demonstrated a higher flame performance index for APO-containing samples 2 and 4, having 15 and 10 wt % TexFRon 4002, respectively, in comparison to corresponding samples 3 and 5, which were APO-free. Additionally, it was noted that an increase in the flame retardant content within the sample appears to result mostly in an increase in the fire performance index.

Example 5

APO-free wood coating formulations comprising 15% TexFRon 4200 and varying resins were prepared as described in Example 3, by replacing Alberdingk AC-2523 with the desired resin in each formulation as indicated in Table 3 herein below. The obtained formulations were applied onto plywood boards as described hereinabove. The different APO-free coating formulations and their corresponding NFPA testing results are summarized in Table 3:

TABLE 3

|  | Alberdingk AC 2523 | Alberdingk AC 2019 | Alberdingk U9600 VP | DOW Primal IW-3311 |
|---|---|---|---|---|
| Resin (wt %) | 51.2 | 51.2 | 53.2 | 53.2 |
| BYK-093 (wt %) | 0.8 | 0.8 | — | — |
| BYK-346 (wt %) | 0.3 | 0.3 | 0.3 | 0.3 |
| BYK-2010 (wt %) | 1 | 1 | — | — |
| Premix-4002 (wt %) | 46.2 | 46.2 | 46.2 | 46.2 |
| Rheolate-212 (wt %) | 0.5 | 0.5 | — | — |
| Tafigel PUR 45 (wt %) | — | — | 0.3 | 0.3 |
| NFPA 701 (sec) | 9.03 | 33.4 | 22.8 | 9.55 |
| % solids (calculated) | 40 | 39 | 34 | 37 |

According to Table 3, Alberdingk AC-2523 acrylic resin yielded the best results in terms of shortest time to achieve an auto-extinguished sample.

Example 6

A comparative example between the wood coating formulations of the invention which are based on TexFRon 4002 flame retardant and wood coating formulations based on the known flame retardant FR-1410 (reference samples) was carried out in the following manner: two coating formulations having 15 wt % flame retardant material and two coating formulations having 10 wt % flame retardant material where prepared for each flame retardant (TexFRon 4002 and FR-1410) as described in Example 3. One of each coating formulation was APO-free and the other had APO additive therein according to Table 4:

TABLE 4

|  | 15% TexFRon 4200 | 15% TexFRon 4200 + APO | 15% FR-1410 | 15% FR-1410 + APO | 10% TexFRon 4200 | 10% TexFRon 4200 + APO | 10% FR-1410 | 10% FR-1410 + APO |
|---|---|---|---|---|---|---|---|---|
| Alberdingk AC 2523 (wt %) | 51.2 | 39.59 | 51.5 | 34.2 | 67.4 | 59.86 | 67.4 | 56.4 |
| APO (wt %) | — | 11.61 | — | 17 | — | 7.54 | — | 11 |
| BYK-093 (wt %) | 0.8 | 0.8 | 0.8 | 0.8 | 0.8 | 0.8 | 0.8 | 0.8 |
| BYK-346 (wt %) | 0.3 | 0.3 | 0.3 | 0.3 | 0.3 | 0.3 | 0.3 | 0.3 |
| BYK-2010 (wt %) | 1 | 1 | 1 | 1 | 1 | 1 | 1 | 1 |

TABLE 4-continued

|  | 15% TexFRon 4200 | 15% TexFRon 4200 + APO | 15% FR-1410 | 15% FR-1410 + APO | 10% TexFRon 4200 | 10% TexFRon 4200 + APO | 10% FR-1410 | 10% FR-1410 + APO |
|---|---|---|---|---|---|---|---|---|
| ***FR Premix (wt %) | 46.2 | 46.2 | 45.9 | 46.2 | 30 | 30 | 30 | 30 |
| Rheolate-212 (wt %) | 0.5 | 0.5 | 0.5 | 0.5 | 0.5 | 0.5 | 0.5 | 0.5 |
| NFPA 701 (sec) | 9.03 | 3.23 | 8.91 | 3.95 | 55.4 | 2.27 | fail | 2.7 |

***The premix composition used for FR-1410 was prepared according to the procedure described in Example 2, only utilizing FR-1410 instead of TexFRon 4002 as the main flame retardant.

***The premix composition used for FR-1410 was prepared according to the procedure described in Example 2, only utilizing FR-1410 instead of TexFRon 4002 as the main flame retardant.

The wood boards coated with formulations based on FR-1410 appeared white in comparison to the wood boards coated with TexFRon 4002 based formulations, which appeared to maintain the original wood color as a result of the transparent coating which was formed.

According to Table 4 it can be seen that for both flame retardants (FR-1410 and TexFRon 4002) the presence of APO within the coating improved the auto-extinguishing time of the samples. Additionally, it was demonstrated, that in the presence of APO, TexFRon 4002 formulations were shown to be superior to FR-1410 formulations in terms of auto-extinguishing time of the corresponding samples.

An additional parameter that was demonstrated is the wood appearance after the coating. The wooden sample coated with FR-1410 appeared to be white in comparison to the wooden sample coated with TexFRon 4002. This advantage of the flame retardant coating of the invention is achieved even though the particle size distribution of the FR-1410 is similar to the particle size distribution of TexFRon 4002. It should be noted that the solid wt % was similar for both FR-1410 and TexFRon 4002 formulations.

Example 7

Paint formulation was applied on glass using an applicator (byko-drive by BYK) with 10 cm Film Casting Knife (BYK) forming a 300 micron wet film. After 24 h the dry film was pulled-off from the glass and was analyzed for transparency using DATACOLOR 650 (by DATACOLOR). The transparency properties of the flame retardant coating of the invention are detailed in Table 5:

TABLE 5

| Sample | Transparency (%) |
|---|---|
| 99.45% Alberdingk acrylic resin (AC 2523) + 0.25% Byk 346 + 0.3% Tafigel 45 | 99.38 |
| 68.8% Alberdingk acrylic resin (AC 2523) + 30.2% TexFRon 4002 premix + 0.66% Byk 346 + 0.34% Tafigel 45 | 46.5 |

As can be seen from the transparency measurement, the original color of the wooden sample was visible, the coating which included the flame retardant therein appeared to be translucent, giving rise to a mat finishing of the wooden sample.

The invention claimed is:
1. A flame retarded wood-based substrate having a homogeneous flame retardant film thereon, said film comprising micronized particles of brominated epoxy polymer according to Formula I,

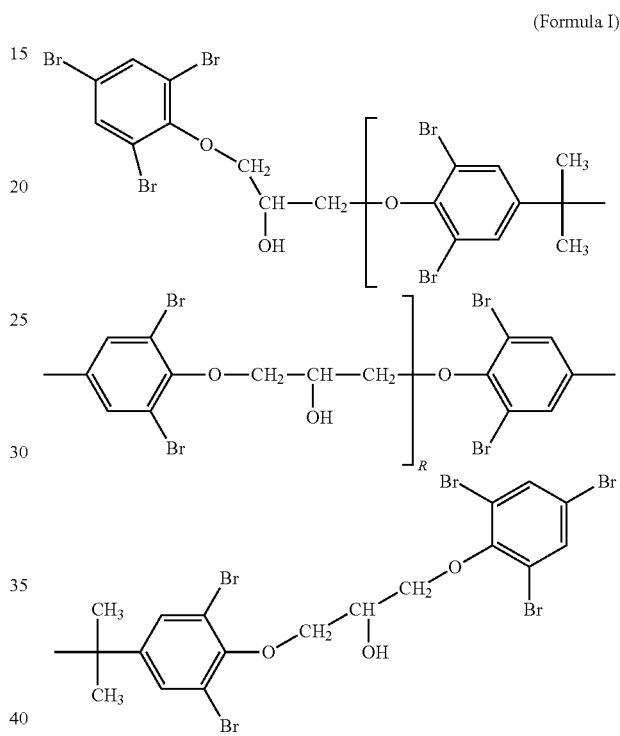

(Formula I)

wherein n indicates the degree of polymerization having a molecular weight ranging from 1,000 to 5,000 grams/mol;
attached to the surface of said wood-based substrate, wherein:
said micronized particles have a size distribution of d50<5 micron, d90<10 micron and d99<30 micron;
said homogenous flame retardant film comprises a binding agent in an amount of at least 35% by weight; and
said homogenous flame retardant film optionally further comprises at least one additive selected from the group consisting of a flame retardant synergist, a smoldering suppressant agent, a surface active agent, an antifoaming agent, a preservative, a stabilizing agent, a thickening agent, a dispersing agent, a wetting agent, a suspending agent, a pH buffer, a hardener, a curing agent, a sequestering agent, a detergent, a dye, a pigment and any mixture thereof.
2. The flame retarded wood-based substrate of claim 1, wherein said film is transparent.
3. The flame retarded wood-based substrate of claim 1, wherein said wood-based substrate displays its original color.
4. The flame retarded wood-based substrate of claim 1, having an "after flame" time ranging from 0 seconds to 10 seconds.

5. The flame retarded wood-based substrate of claim 1, wherein said flammable wood-based substrate is a natural wood substrate or an engineered wood and any combination thereof.

* * * * *